US008421282B2

(12) United States Patent
Ota

(10) Patent No.: US 8,421,282 B2
(45) Date of Patent: Apr. 16, 2013

(54) POWER TOOL

(75) Inventor: Kenichi Ota, Anjo (JP)

(73) Assignee: Makita Corporation, Anjo-Shi (JP)

( * ) Notice: Subject to any disclaimer, the term of this patent is extended or adjusted under 35 U.S.C. 154(b) by 217 days.

(21) Appl. No.: 12/857,902

(22) Filed: Aug. 17, 2010

(65) Prior Publication Data

US 2011/0043057 A1   Feb. 24, 2011

(30) Foreign Application Priority Data

Aug. 21, 2009 (JP) ................................ 2009-192440

(51) Int. Cl.
*H02K 3/00* (2006.01)
(52) U.S. Cl.
USPC ............. 310/50; 310/198; 310/184; 310/179; 310/180
(58) Field of Classification Search ................ 310/50, 310/198, 184, 179, 180
See application file for complete search history.

(56) References Cited

U.S. PATENT DOCUMENTS

| 4,354,127 | A | * | 10/1982 | Stroud | ........................... 310/198 |
| 4,356,418 | A | * | 10/1982 | Stroud | ........................... 310/184 |
| 4,549,106 | A | * | 10/1985 | Stroud | ........................... 310/184 |
| 6,281,609 | B1 | | 8/2001 | Itami et al. | |
| 6,465,918 | B1 | * | 10/2002 | Itami et al. | ................... 310/68 B |
| 6,717,314 | B2 | * | 4/2004 | Horst et al. | .............. 310/156.43 |
| 6,946,768 | B2 | * | 9/2005 | Kruse | ........................... 310/179 |
| 7,009,320 | B2 | * | 3/2006 | Akita et al. | .................... 310/179 |
| 7,388,312 | B2 | * | 6/2008 | Hyodo et al. | ................. 310/198 |
| 2004/0145266 | A1 | * | 7/2004 | Gladkov | ........................ 310/180 |
| 2004/0256942 | A1 | * | 12/2004 | Yokoyama et al. | ........... 310/180 |
| 2006/0087193 | A1 | * | 4/2006 | Hyodo et al. | ................. 310/198 |
| 2007/0210733 | A1 | * | 9/2007 | Du et al. | ........................ 318/268 |

FOREIGN PATENT DOCUMENTS

| EP | 1 650 853 A1 | 4/2006 |
| JP | Y2-61-3241 | 2/1986 |
| WO | WO 2007/098227 A2 | 8/2007 |

OTHER PUBLICATIONS

Jul. 26, 2012 International Search Report issued in EP Patent Application No. 10173303.8.

* cited by examiner

*Primary Examiner* — Tran Nguyen
*Assistant Examiner* — Alex W Mok
(74) *Attorney, Agent, or Firm* — Oliff & Berridge, PLC

(57) ABSTRACT

It is an object of the invention to provide a technique for easily controlling the output characteristic of a brushless motor in a power tool by adjusting the number of turns of a coil that forms a stator winding. A power tool has a brushless motor which includes a rotor 133 having a permanent magnet, a cylindrical stator, and three-phase stator windings which are installed on an inner circumferential side of the stator and rotationally drive the rotor. A plurality of slots are formed in an inside surface of the stator at predetermined intervals in a circumferential direction. Each of the three stator windings is formed by a plurality of coils wound through the slots of the stator and connected to each other. The total number of turns of the coils wound through the slots in each phase is the same in the three phases and not a multiple of the number of the slots in each phase.

6 Claims, 14 Drawing Sheets

(a)

(b)

(a)

(b)

POWER TOOL

BACKGROUND OF THE INVENTION

1. Field of the Invention

The invention relates to a power tool having a three-phase brushless motor, and more particularly, to a technique for controlling an output characteristic of the motor for the power tool.

2. Description of the Related Art

A stator of a brushless motor is known to have a plurality of slots provided on its inner circumferential surface side on which a rotor including a permanent magnet is disposed. A stator winding is formed by winding coils through the slots and connecting them in series or in parallel. When driving current of the motor is supplied to the coils of the stator winding, a magnetic field is generated around the coils and the magnetic field interacts with the field generated by the permanent magnet, so that a rotor is driven.

The known stator winding includes the same number of turns of coils wound through the slots, which number is selected depending on the desired output characteristic of the motor or the desired torque or rotation speed. If a different number of turns is selected for each of the coils forming the stator winding, the magnetic field which is generated around each coil when the driving current passes through the coil will vary in strength. As a result, variations in the torque of the motor may be caused, so that a vibration problem may arise.

On the other hand, however, the torque output characteristic of the motor may not reach to a desired level if all of the coils are wound "n" turns, while it may exceed a desired level if all of the coils are wound "n+1" turns.

In this connection, Japanese Utility Model Publication No. 61-3241A discloses a technique to control the number of turns of coils for controlling the motor characteristic. According to the known art, a subsidiary stator winding is provided in the same phase as a main stator winding and the number of slots of the subsidiary stator winding or the number of turns per slot can be changed. However, in this known art, a subsidiary stator winding is used in addition to the main stator winding, which disadvantageously limits a space for winding the main stator winding.

SUMMARY OF THE INVENTION

Accordingly, it is an object of the invention to provide a technique for easily controlling the output characteristic of a brushless motor in a power tool by adjusting the number of turns of a coil that forms a stator winding.

Above-described object can be achieved by a claimed invention. According to one aspect of the invention, a representative power tool has a brushless motor which includes a rotor having a permanent magnet, a cylindrical stator, and three-phase stator windings which are installed on an inner circumferential side of the stator and rotationally drive the rotor, and the power tool performs a predetermined operation by rotationally driving a tool bit by the brushless motor. The "power tool" according to this invention widely includes electric power tools powered by a motor, such as power tools for use in hammering, drilling or tightening operation, and power tools for use in cutting, grinding or polishing operation.

According to the representative power tool, a plurality of slots are formed in an inside surface of the stator at predetermined intervals in a circumferential direction. Each of the three-phase stator windings is formed by a plurality of coils wound through the slots of the stator and connected to each other and the number of turns of the coils that form a stator winding in each phase is adjusted to control the output characteristic of the motor. According to the invention, unlike the prior art in which a subsidiary stator winding is used to adjust the output characteristic of the motor, a space for installing the subsidiary stator winding in the stator is not required, so that the installation space for the stator winding can be easily ensured.

As one aspect of the invention, the total number of turns of the coils wound through the slots in each phase may preferably be the same in the three phases and not a multiple of the number of the slots in each phase. For example, in a construction having two slots in each phase (in which a stator winding of each phase consists of two coils), it may preferably be arranged such that the total number of turns of coils in each phase is seven and such that one of the two coils in each phase consists of three turns of wire, while the other coil consists of four turns of wire, or one of the two coils in each phase consists of two turns of wire, while the other consists of five turns of wire. According to this construction, the three-phase stator windings consist of coils of the same number of turns, and therefore, when the driving current passes through the stator windings, the magnetic field that is generated around each of the stator windings does not easily vary in strength.

According to a further aspect of the invention, provided that the total number of turns of the coils wound through the slots in each phase is the same in the three phases and not a multiple of the number of the slots in each phase, Xth coils in the three phases may include the same number of turns of wire, and with reference to the number of turns of one of the coils wound through the slots in each phase, the number of turns of at least one of the other coils may have a difference of one turn and the number of turns of each of the other coils may have no difference or a difference of one turn. The "Xth" coil in this invention refers to the Xth coil from its start position of winding through the slots.

According to this aspect, with the above-described construction, the difference in the number of turns of the coils wound through slots in each phase can be minimized. Therefore, imbalance in the number of turns of the coils can be minimized, so that balanced adjustment of the number of turns of the coils can be made. As a result, contact between adjacent coils wound through adjacent slots can be rationally avoided, and the heights of coil ends can be made almost equal to each other, so that heat generation is also almost evenly caused.

According to a further aspect of the invention, provided that the Xth coils in the three phases consist of the same number of turns of wire, and that, with reference to the number of turns of one of the coils wound through the slots in each phase, the number of turns of at least one of the other coils may have a difference of one turn and the number of turns of each of the other coils may have no difference or a difference of one turn, adjacent to the Xth coils are other than Xth coils in different phases.

With such construction, imbalance in the number of turns of the coils of the stator windings can be minimized in the circumferential direction of the stator. Therefore, balanced adjustment of the number of turns of the coils can be made. As a result, contact between adjacent coils wound through adjacent slots can be rationally avoided, and the heights of coil ends are made almost equal to each other, so that heat generation is also almost evenly caused.

According to another aspect of the invention, the number of turns of coils may preferably be adjusted such that the total number of turns of the coils in one of the three phases is different from that of one of the other two phases and the total number of turns of the coils wound through all the slots is not a multiple of three.

According to this aspect, the output characteristic of the motor can be easily controlled by adjusting the number of turns of the coils that form a stator winding in each phase. For example, in a construction in which two slots are provided in each phase (a stator winding of each phase consists of two coils), it may be arranged such that the total numbers of turns of coils are seven in two of the three phases and eight in the other one and such that one of the two coils in each of the two phases consists of three turns of wire and the other consists of four turns of wire, while one of the two coils in the other phase consists of three turns of wire and the other consists of five turns of wire.

With such construction, the total number of turns of the coils in two of the three phases is the same, and its difference from that in the other phase can be minimized. Therefore, when the driving current passes through the stator windings, the magnetic field that is generated around each of the stator windings does not easily vary in strength.

According to a further aspect of the invention, provided that the total number of turns of the coils wound through all the slots is not a multiple of three, with reference to the number of turns of the coils wound through the slots in one of the phases, the number of turns of the coils in at least one of the other phases may have a difference of one turn and the number of turns of the coils in the other phase may have no difference or a difference of one turn.

According to this aspect, with the above-described construction, the difference in the number of turns of the coils between the different phases can be minimized. Therefore, imbalance in the number of turns of the coils can be minimized, so that balanced adjustment of the number of turns of the coils can be made. As a result, contact between adjacent coils wound through adjacent slots can be rationally avoided, and the heights of coil ends are made almost equal to each other, so that heat generation is also almost evenly caused.

According to a further aspect of the invention, provided that, with reference to the number of turns of the coils wound through the slots in one of the phases, the number of turns of the coils in at least one of the other phases may have a difference of one turn and the number of turns of the coils in the other phase may have no difference or a difference of one turn, Xth coils in the three phases consist of the same number of turns of wire, and adjacent to the Xth coils are other than Xth coils in different phases.

According to this aspect, with the above-described construction, imbalance in the number of turns of the coils of the stator windings can be minimized in the circumferential direction of the stator. Therefore, balanced adjustment of the number of turns of the coils can be made. As a result, contact between adjacent coils wound through adjacent slots can be rationally avoided, and the heights of coil ends are made almost equal to each other, so that heat generation is also almost evenly caused.

According to the invention, a technique for easily controlling the output characteristic of a motor by adjusting the number of turns of a coil that forms a stator winding is provided in a power tool having a brushless motor. Other objects, features and advantages of the present invention will be readily understood after reading the following detailed description together with the accompanying drawings and the claims.

BRIEF DESCRIPTION OF THE DRAWINGS

FIG. 6 shows examples of connections of the stator windings in the construction having two slots in each phase (six slots in total), in which FIG. 6(a) shows star connection and FIG. 6(b) shows delta connection.

FIG. 7 shows examples of connections of the stator windings in the construction having three slots in each phase (nine slots in total), in which FIG. 7(a) shows star connection and FIG. 7(b) shows delta connection.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the invention is now described with reference to FIGS. 1 to 12. In this embodiment, an electric (battery-powered) impact driver 100 is described as an example of the "power tool" of the invention. In this embodiment, a driving motor 121 of the impact driver 100 is a three-phase brushless DC motor, and two slots in each phase, or six slots in total, are provided in a stator 135.

Figure 1:
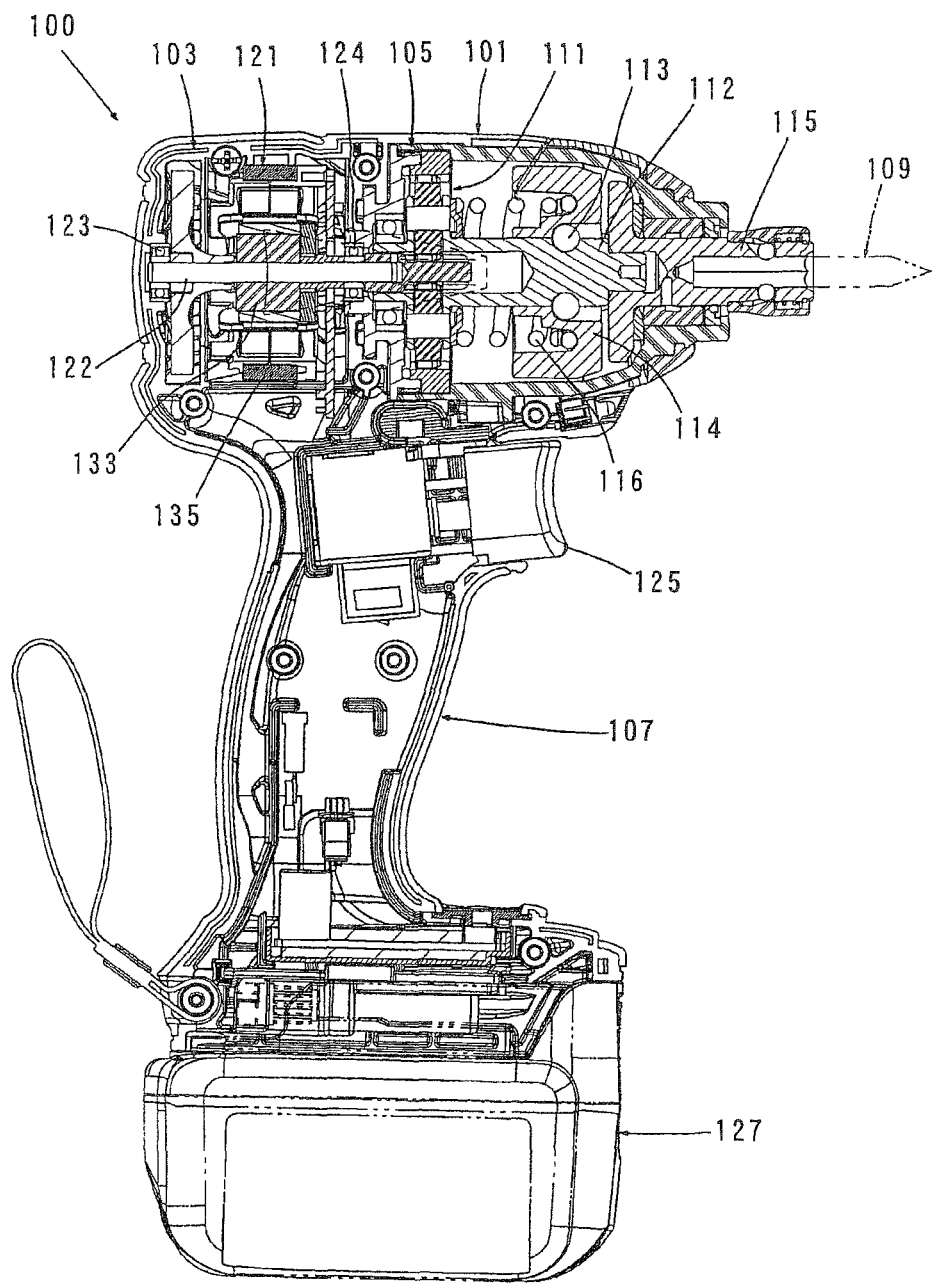
FIG. 1 shows an entire impact driver as an example of a power tool of the invention.
Figure 2:
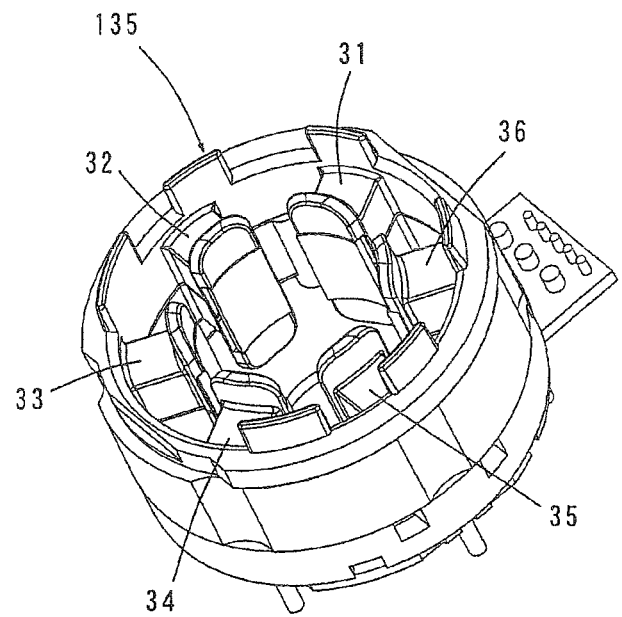
FIG. 2 is a perspective view showing a stator.
Figure 3:
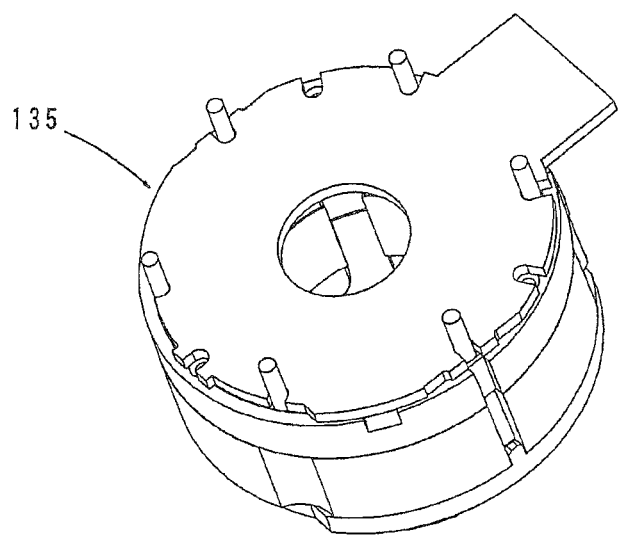
FIG. 3 is a perspective view showing the stator inverted from the state shown in FIG. 2.

As shown in FIG. 1, the impact driver 100 of this embodiment mainly includes a body 101 which forms an outer shell of the impact driver 100, and a driver bit 109 which is detachably coupled to a tip end region of the body 101 and performs an operation of tightening various kinds of screws. The driver bit 109 is a feature that corresponds to the "tool bit" according to the invention.

The body 101 includes a motor housing 103, a gear housing 105 and a handgrip 107. The motor housing 103 houses a driving motor 121. The driving motor 121 is a feature that corresponds to the "brushless motor" according to the invention. A trigger 125 is provided on the handgrip 107, and depressing the trigger 125 turns on a power switch of the driving motor 121.

The gear housing 105 houses a speed reducing mechanism 111, a spindle 112, a hammer 114 and an anvil 115. The speed reducing mechanism 111 includes a planetary gear and appropriately reduces the speed of rotation of an output shaft 122 of the driving motor 121. The spindle 112 is rotated by the speed reducing mechanism 111. The rotation of the spindle 112 causes the hammer 114 to rotate via a transmitting member in the form of a ball 113, which in turn causes the anvil 115 to rotate. The hammer 114 can move with respect to the spindle 112 in its longitudinal direction and is urged toward the anvil 115 by a compression coil spring 116. A front end of the anvil 115 protrudes from the end of the gear housing 105, and the driver bit 109 is detachably coupled to the protruded end of the anvil 115.

When the driving motor 121 is driven for a screw tightening operation and the screw tightening torque of the driver bit 109 is low, the spindle 112 and the hammer 114 rotate together. Under such low-load conditions, the hammer 114 is held in engagement with the anvil 115 by the biasing force of the compression coil spring 116. Thus, the anvil 115 also rotates together with the hammer 114, so that the driver bit 109 performs a screw-tightening operation.

When the tightening torque is increased to a predetermined high level, the hammer 114 moves away from the anvil 115 against the biasing force of the compression coil spring 116. Thereafter, the hammer 114 engages with the anvil 115 as carrying impulsive rotating torque by the biasing force of the compression coil spring 116. Thus, high tightening torque is produced on the driver bit 109 via the anvil 115. The operating principle of the impact driver 100 is known and thus is not described in detail.

The construction of the driving motor 121 is now described in brief. The driving motor 121 in this embodiment is a three-phase brushless DC motor powered by the battery 127. The driving motor 121 mainly includes a rotor 133 and a stator 135 which is fixed to the motor housing 103 and on which a coil forming a stator winding is wound.

One end (the rear end, or the left end as viewed in FIG. 1) of the output shaft 122 is rotatably supported on the motor housing 103 via a bearing 123. The other end (on the side of the speed reducing mechanism 111, or the right side as viewed in FIG. 1) of the output shaft 122 is rotatably supported on the gear housing 105 via a bearing 124.

When the power to the driving motor 121 having the above construction is turned on and driving current is supplied to the stator winding of the stator 135, the rotor 133 is rotationally driven. The operating principle of the DC motor itself is known and thus is not described in detail.

Figure 4:
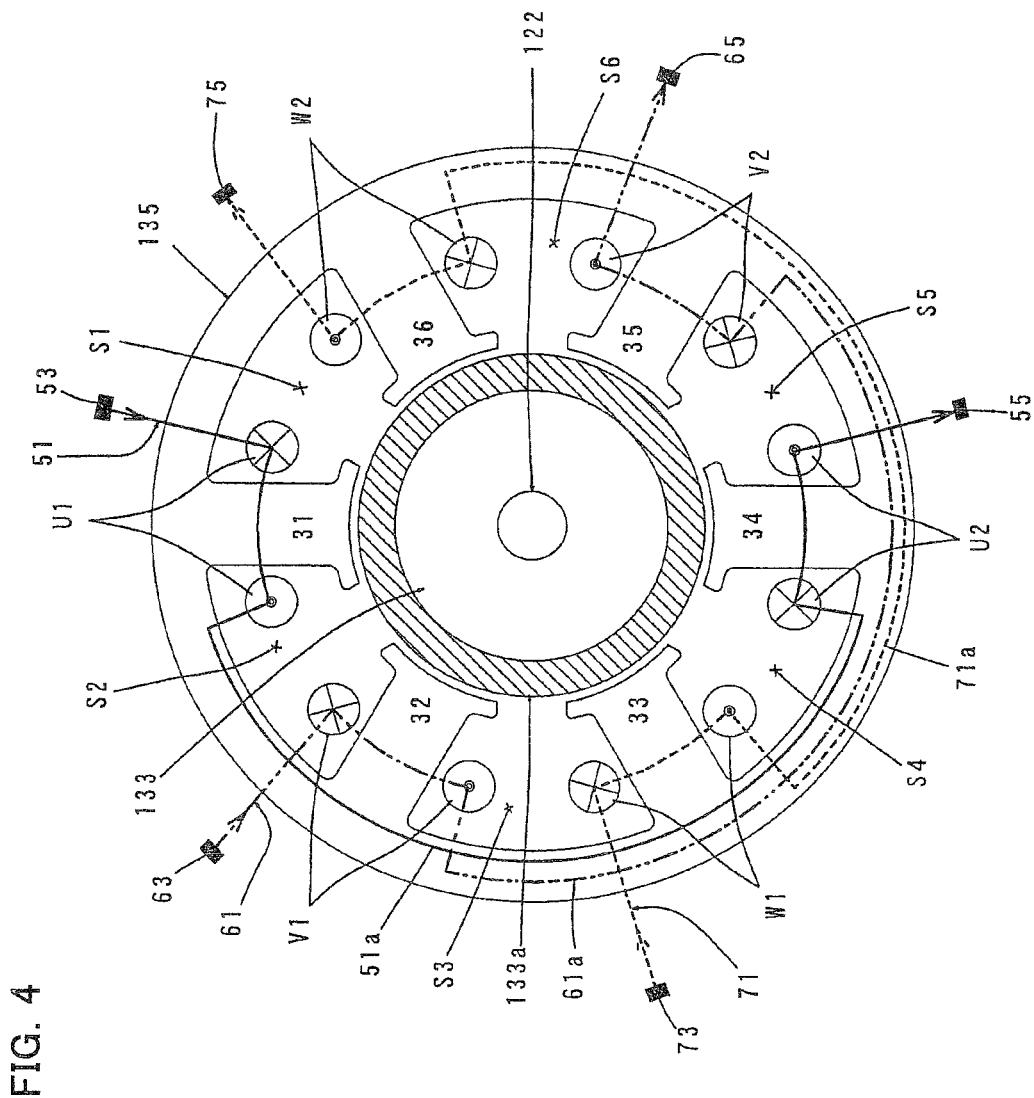
FIG. 4 is a schematic view for illustrating winding of stator windings through slots, in a construction having two slots in each phase (six slots in total).
Figure 5:
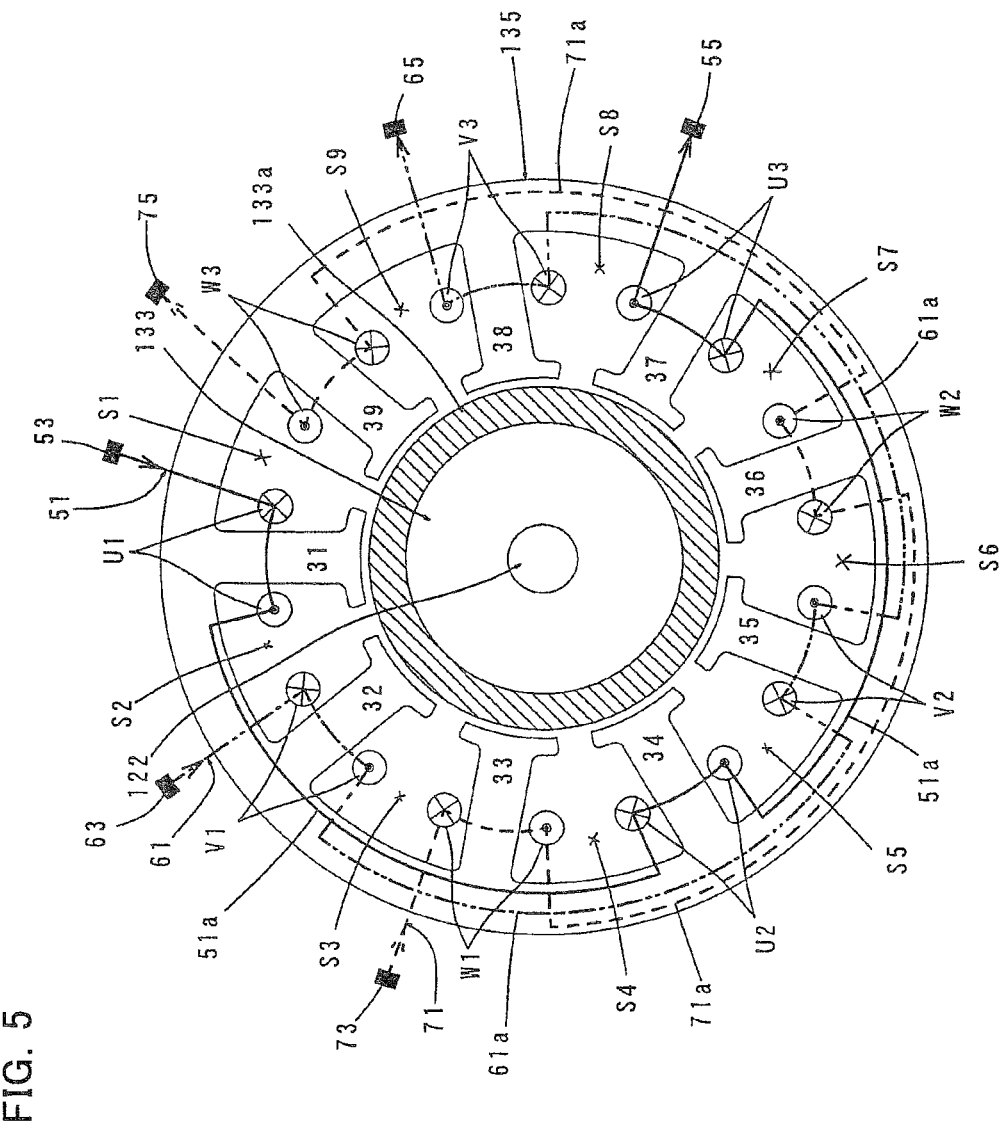
FIG. 5 is a schematic view for illustrating winding of stator windings through slots, in a construction having three slots in each phase (nine slots in total).

The construction of the driving motor 121 (three-phase brushless DC motor) is now described. As shown in FIGS. 4 and 5, a ring magnet (permanent magnet) 133a is disposed on the outer circumferential surface of the rotor 133. The stator 135 is shown in FIGS. 2, 3, 4 and 5. In the example shown in FIGS. 2, 3 and 4, the stator 135 has six teeth 31 to 36 which extend radially inward. Six slots S1 to S6 in total, or two slots in each phase, are formed between the adjacent teeth 31 to 36. In FIG. 4, wires of coils that form stator windings in three phases (phase U, phase V, phase W) are shown wound, and in FIGS. 2 and 3, the stator windings are not yet wound. In the example shown in FIG. 5, the stator 135 has nine teeth 31 to 39 which extend radially inward, and nine slots S1 to S9 in total, or three slots in each phase, are formed between the adjacent teeth 31 to 39.

Next, the construction of each of the stator windings in three phases (phase U, phase V, phase W) which are formed by coils wound through the slots is explained.

In the example shown in FIG. 4 in which two slots are provided in each phase, a phase U stator winding 51 is formed by connecting a coil U1 which is wound around the teeth 31 between the slots S1 and S2 and a coil U2 which is wound around the teeth 34 diametrically opposed to the teeth 31 between the slots S4 and S5, in series or in parallel. A phase V stator winding 61 is formed by connecting a coil V1 which is wound around the teeth 32 between the slots S2 and S3 and a coil V2 which is wound around the teeth 35 diametrically opposed to the teeth 32 between the slots S5 and S6, in series or in parallel. A phase W stator winding 71 is formed by connecting a coil W1 which is wound around the teeth 33 between the slots S3 and S4 and a coil W2 which is wound around the teeth 36 diametrically opposed to the teeth 33 between the slots S6 and S1, in series or in parallel.

In FIG. 4, a cross on each of the coils U1, U2, V1, V2, W1, W2 on one side indicates that the coil runs through the associated slot backward from the plane of the paper of the drawing (away from you) and a double circle on each of the coils U1, U2, V1, V2, W1, W2 on the other side indicates that the coil runs through the associated slot forward from the plane of the paper of the drawing (toward you). The coils U1, U2, V1, V2, W1, W2 are wound by the phase. As shown in FIG. 4 by arrows, in phase U, a wire running from a U starting point 53 (one terminal of the phase U stator winding 51) is wound to form the coil U1 and then the coil U2 and terminated at a U endpoint 55 (the other terminal of the phase U stator winding 51). In phase V, a wire running from a V starting point 63 (one terminal of the phase V stator winding 61) is wound to form the coil V1 and then the coil V2 and terminated at a V endpoint 65 (the other terminal of the phase V stator winding 61). In phase W, a wire running from a W starting point 73 (one terminal of the phase W stator winding 71) is wound to form the coil W1 and then the coil W2 and terminated at a W endpoint 75 (the other terminal of the phase W stator winding 71).

Figure 6:
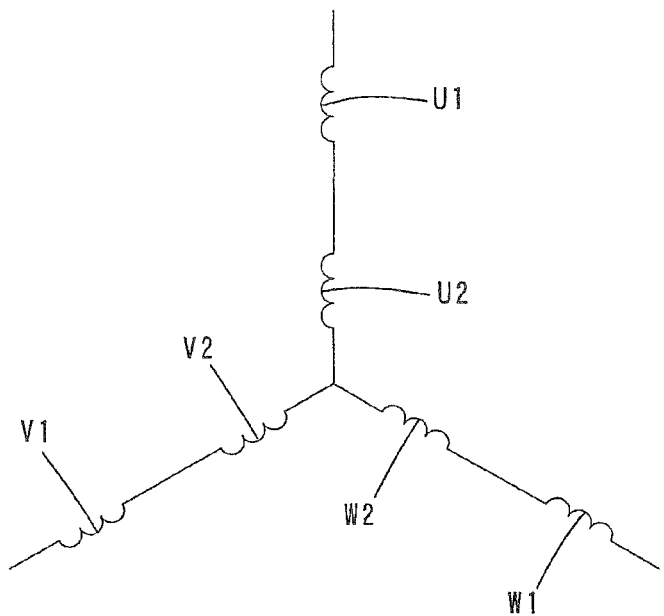
Figure 6:
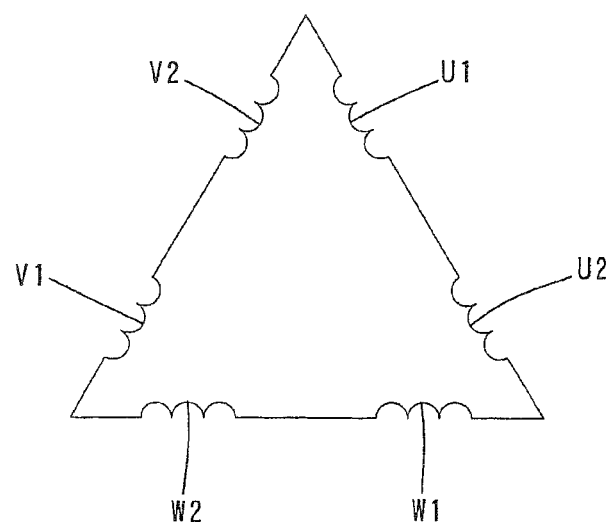

A connecting wire 51a which connects the coils U1 and U2 of the phase U stator winding 51, a connecting wire 61a which connects the coils V1 and V2 of the phase V stator winding 61 and a connecting wire 71a which connects the coils W1 and W2 of the phase W stator winding 71 are arranged on the side of one end (the same side) of the teeth 31 to 36 in the longitudinal direction and extends on a radially outer portion of an end surface of the stator 135 along its circumferential direction, in order to prevent interference with the rotor 133 housed in the stator 135. As shown in FIG. 6, the coils U1, U2, V1, V2, W1, W2 of the three-phase stator windings which are wound around the teeth 31 to 36 are connected either by star connection (shown in FIG. 6(a)) or by delta connection (shown in FIG. 6(b)). In FIG. 6, the coils of the same phase are shown connected in series.

In the example shown in FIG. 5, a phase U stator winding 51 is formed by connecting a coil U1 which is wound around the teeth 31 between the slots S1 and S2, a coil U2 which is wound around the teeth 34 spaced 120 degrees apart from the teeth 31 between the slots S4 and S5, and a coil U3 which is wound around the teeth 37 spaced 120 degrees apart from the teeth 34 between the slots S7 and S8, in series or in parallel. A phase V stator winding 61 is formed by connecting a coil V1 which is wound around the teeth 32 between the slots S2 and S3, a coil V2 which is wound around the teeth 35 spaced 120 degrees apart from the teeth 32 between the slots S5 and S6, and a coil V3 which is wound around the teeth 38 spaced 120 degrees apart from the teeth 35 between the slots S8 and S9, in series or in parallel. A phase W stator winding 71 is formed by connecting a coil W1 which is wound around the teeth 33 between the slots S3 and S4, a coil W2 which is wound around the teeth 36 spaced 120 degrees apart from the teeth 33 between the slots S6 and S7, and a coil W3 which is wound around the teeth 39 spaced 120 degrees apart from the teeth 36 between the slots S9 and S1, in series or in parallel.

In FIG. 5, a cross on each of the coils U1, U2, U3, V1, V2, V3, W1, W2, W3 on one side indicates that the coil runs through the associated slot backward from the plane of the paper of the drawing (away from you) and a double circle on each of the coils U1, U2, U3, V1, V2, V3, W1, W2, W3 on the other side indicates that the coil runs through the associated slot forward from the plane of the paper of the drawing (toward you). The coils U1, U2, U3, V1, V2, V3, W1, W2, W3 are wound by the phase. As shown in FIG. 5 by arrows, in phase U, a wire running from a U starting point 53 (one terminal of the phase U stator winding 51) is wound to form the coils U1, U2 and U3 in this order and terminated at a U endpoint 55 (the other terminal of the phase U stator winding 51). In phase V, a wire running from a V starting point 63 (one terminal of the phase V stator winding 61) is wound to form the coils V1, V2 and V3 in this order and terminated at a V endpoint 65 (the other terminal of the phase V stator winding 61). In phase W, a wire running from a W starting point 73 (one terminal of the phase W stator winding 71) is wound to form the coils W1, W2 and W3 in this order and terminated at a W endpoint 75 (the other terminal of the phase W stator winding 71).

Figure 7:
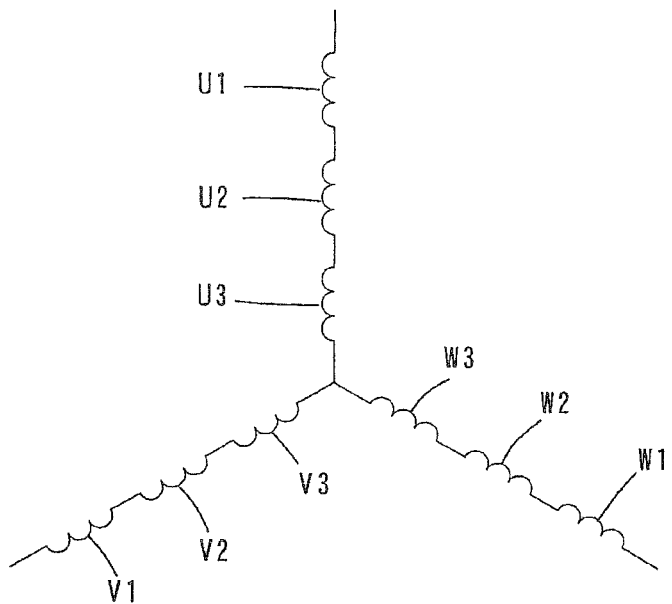
Figure 7:
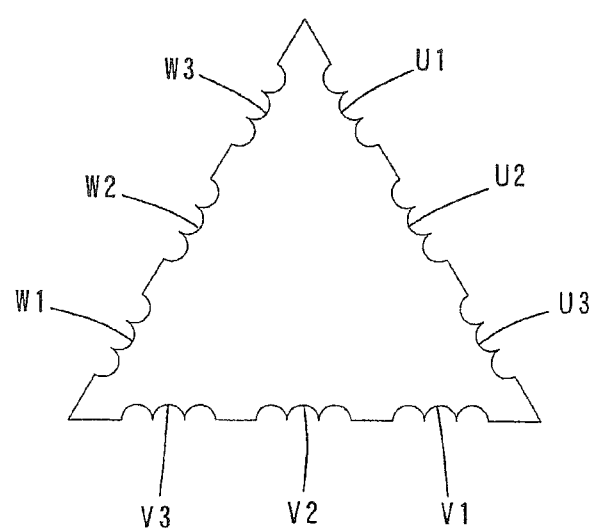

A connecting wire 51a which connects the coils U1, U2 and U3 of the phase U stator winding 51, a connecting wire 61a which connects the coils V1, V2 and V3 of the phase V stator winding 61 and a connecting wire 71a which connects the coils W1, W2 and W3 of the phase W stator winding 71 are arranged on the side of one end (the same side) of the teeth 31 to 39 in the longitudinal direction and extends on a radially outer portion of an end surface of the stator 135 along its circumferential direction, in order to prevent interference with the rotor 133 housed in the stator 135. As shown in FIG. 7, the coils U1, U2, U3, V1, V2, V3, W1, W2, W3 of the three-phase stator windings which are wound around the teeth 31 to 39 are connected either by star connection (shown in FIG. 7(a)) or by delta connection (shown in FIG. 7(b)). In FIG. 7, the coils of the same phase are shown connected in series.

Figure 20:
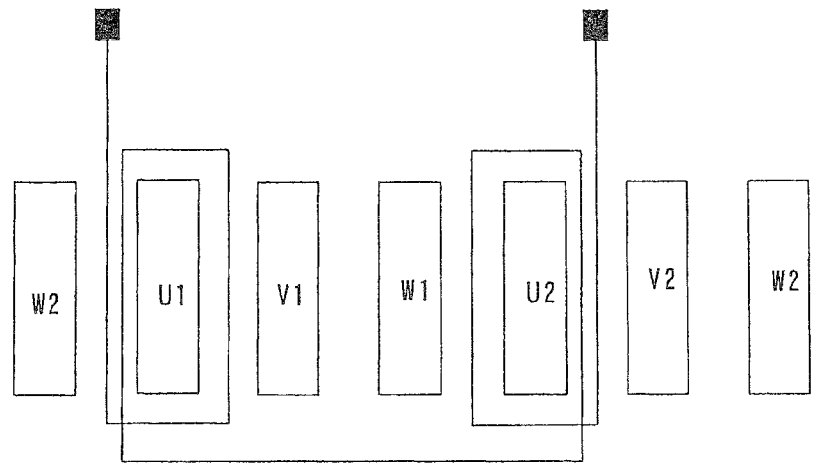
FIG. 20 is a schematic diagram for illustrating adjustment of the number of turns of the coils, in the case in which start and end positions of winding coils are located on the same side.
Figure 21:
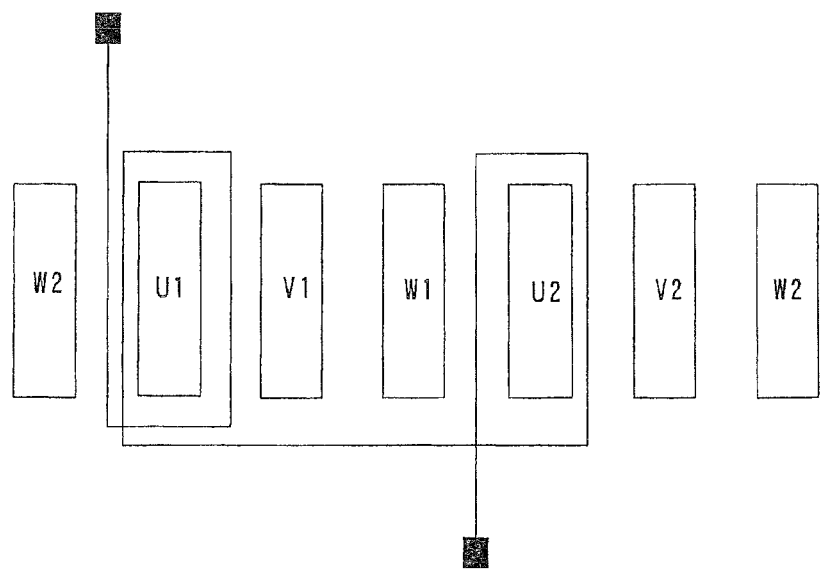
FIG. 21 is a schematic diagram for illustrating adjustment of the number of turns of the coils, in the case in which start and end positions of winding coils are located on the different sides.

Adjustment of the number of turns of the coils of the stator windings 51, 61, 71 is now explained. The adjustment of the number of turns of the coils here does not include an adjustment by changing the start and end positions of coil winding (to either the same side as shown in FIG. 20 or different sides as shown in FIG. 21), and an adjustment by changing the positions of the connecting wires (either to the side of the winding start position or to the side opposite from the winding start position as shown in FIGS. 20 and 21).

Figure 22:
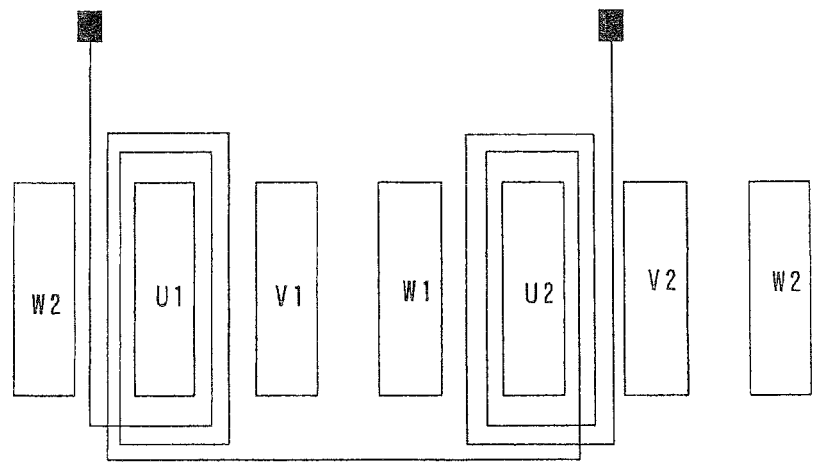
FIG. 22 is a schematic diagram for illustrating adjustment of the number of turns of the coils (by changing the number of turns of the coils shown in FIG. 20) in a conventional technique.
Figure 23:
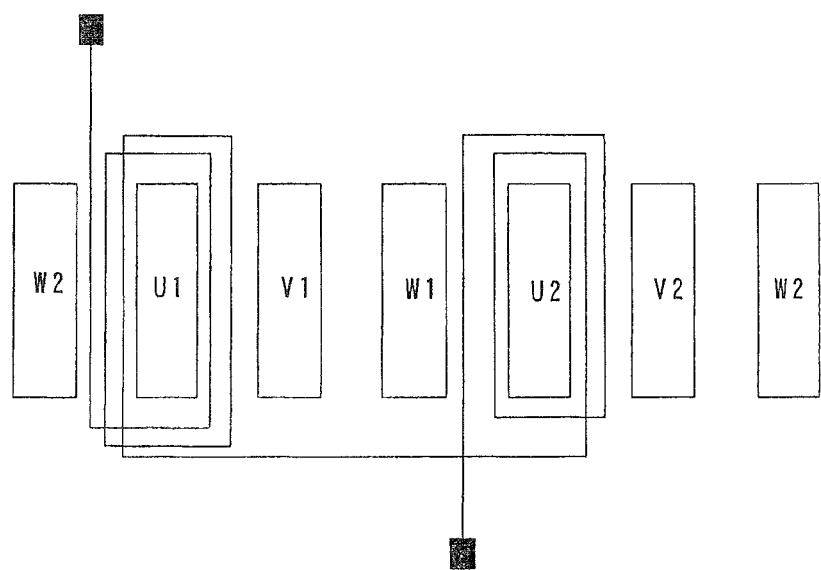
FIG. 23 is a schematic diagram for illustrating adjustment of the number of turns of the coils (by changing the number of turns of the coils shown in FIG. 21) in a conventional technique.
Figure 24:
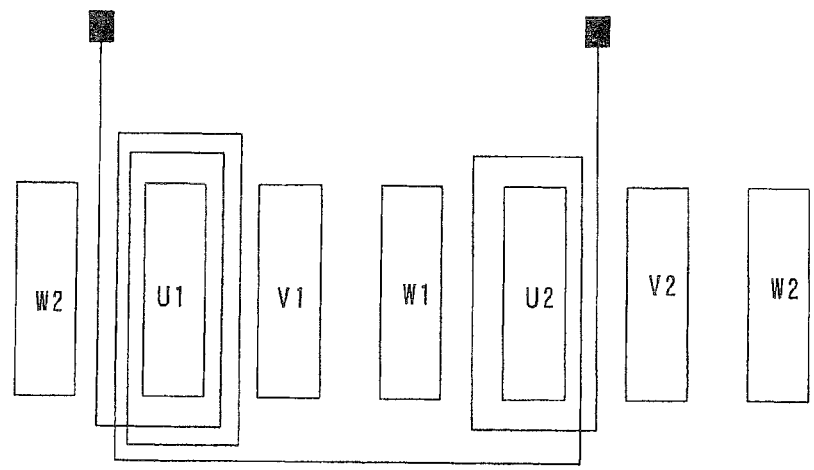
FIG. 24 is a schematic diagram for illustrating adjustment of the number of turns of the coils (by changing the number of turns of the coils shown in FIG. 20) in this invention.
Figure 25:
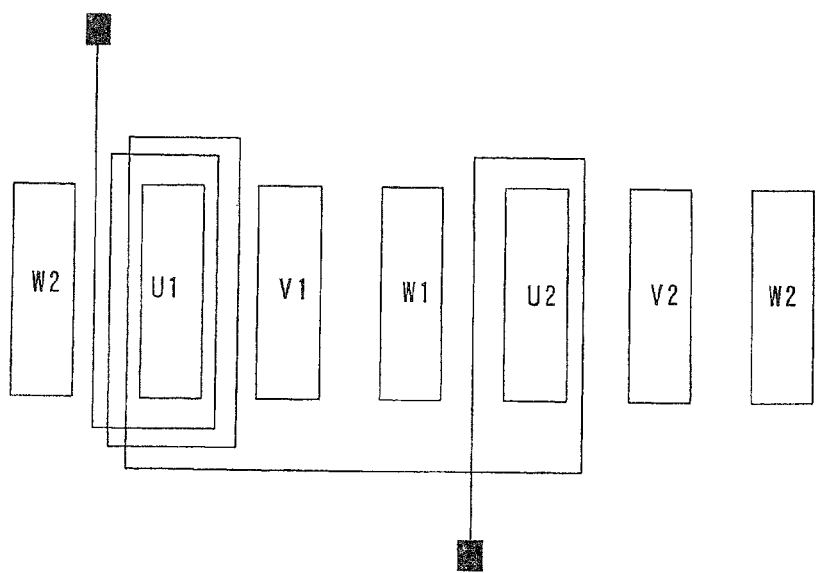
FIG. 25 is a schematic diagram for illustrating adjustment of the number of turns of the coils (by changing the number of turns of the coils shown in FIG. 21) in this invention.
Figure 26:
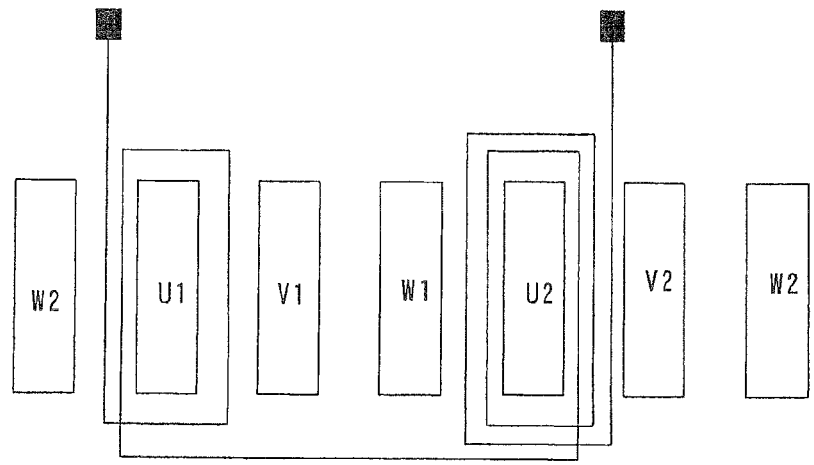
FIG. 26 is a schematic diagram for illustrating adjustment of the number of turns of the coils (by changing the number of turns of the coils shown in FIG. 20) in this invention.
Figure 27:
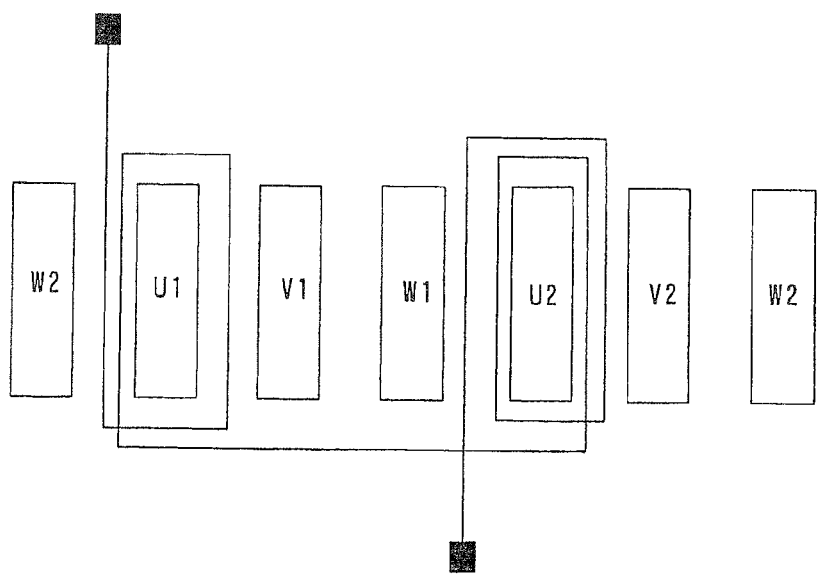
FIG. 27 is a schematic diagram for illustrating adjustment of the number of turns of the coils (by changing the number of turns of the coils shown in FIG. 21) in this invention.

FIGS. 20 to 27 are drawings for illustrating adjustment of the number of turns of the coils, and in the drawings, only the phase U coils are shown in the construction in which the stator winding of each phase has two coils. Generally, in a conventional technique, in order to control a motor characteristic by adjusting the number of turns of coils of the stator winding, the number of turns of each coil of each phase is increased. Specifically, when the motor shown in FIGS. 20 and 21 has the U-phase coils U1 and U2 of one turn each, or two turns in total, wound through the associated slots, generally in a conventional technique, as shown in FIGS. 22 and 23, each of the numbers of turns of the U-phase coils U1 and U2 wound through the associated slots is increased by one turn, so that the motor having the coils of four turns is provided. In the case shown in FIGS. 20 and 22, the winding start and end positions are located on the same side, while, in the case shown in FIGS. 21 and 23, they are located on the different sides. In the both cases, however, the coils are wound the same number of turns (one turn). Specifically, in a conventional technique, adjustment of the number of turns of the coils (motor characteristic) is made by increasing (or decreasing) the number of turns of each coil wound through the associated slots by a factor of an integral multiple.

In this invention, in the motor (shown in FIGS. 20 and 21) having the coils U1 and U2 of one turn each, or two turns in total, wound through the associated slots, as shown in FIGS. 24 to 27, only the number of turns of either one of the coils U1 and U2 is increased by one turn, so that the motor having the coils of three turns in total is provided. Specifically, in FIGS. 24 and 25, only the number of turns of the coil U1 is increased by one turn, and in FIGS. 26 and 27, only the number of turns of the coil U2 is increased by one turn. When the stator winding has three coils (three slots), such adjustment is made by increasing (or decreasing) the number of turns of either one or two of the coils wound through the associated slots.

Embodiments of adjustment of the number of turns of the coils of the stator windings 51, 61, 71 according to this invention are now explained.

First Embodiment

Figure 8:
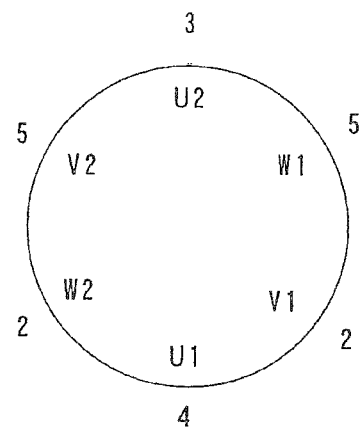
FIG. 8 is a schematic diagram for illustrating adjustment of the numbers of turns of coils in a first embodiment, in the construction having two slots in each phase.

FIG. 8 is a schematic diagram for illustrating adjustment of the numbers of turns of the coils in a construction having two slots in each phase, and shows the arrangement and the numbers of turns of the coils U1, U2, V1, V2, W1, W2. Numerals in the drawing represent the numbers of turns of the coils. In this embodiment, the number of turns of the coils wound through the associated slots in each phase is seven in total in each of the three phases U, V, and W. Specifically, the U-phase stator winding 51 is formed by the coil U1 of four turns and the coil U2 of three turns, the V-phase stator winding 61 is formed by the coil V1 of two turns and the coil V2 of five turns, and the W-phase stator winding 71 is formed by the coil W1 of five turns and the coil W2 of two turns. Therefore, in this case, the number of turns of the coils per slot is 3.5 turns.

Figure 9:
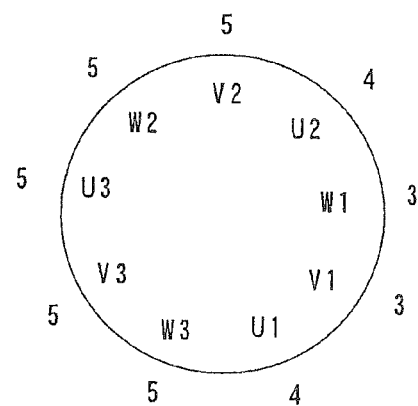
FIG. 9 is a schematic diagram for illustrating adjustment of the numbers of turns of coils in the first embodiment, in the construction having three slots in each phase.

FIG. 9 is a schematic diagram for illustrating adjustment of the number of turns of the coils in a construction having three slots in each phase, and shows the arrangement and the numbers of turns of the coils U1, U2, U3, V1, V2, V3, W1, W2, W3. Numerals in the drawing represent the numbers of turns of the coils. In this embodiment, the total number of turns of the coils wound through the associated slots in each phase is thirteen in each of the three phases U, V, and W. Specifically, the U-phase stator winding 51 is fanned by the coil U1 of four turns, the coil U2 of four turns and the coil U3 of five turns, the V-phase stator winding 61 is formed by the coil V1 of three turns, the coil V2 of five turns and the coil V3 of five turns, and the W-phase stator winding 71 is formed by the coil W1 of three turns, the coil W2 of five turns and the coil W3 of five turns. Therefore, in this case, the number of turns of the coils per slot is 4.33 turns.

Specifically, in the first embodiment shown in FIGS. 8 and 9, the total number of turns of the coils of the stator winding which are wound through the slots in each phase is the same in the three phases, and this number is not a multiple of the number of the slots.

According to the first embodiment constructed as described above, the total number of turns of the coils of each of the stator windings 51, 61, 71 in all of the three phases U, V and W is the same as that of the others (seven). Therefore, when the driving current passes through the stator windings 51, 61, 71, the magnetic field that is generated around each of the stator windings 51, 61, 71 does not easily vary in strength.

Further, according to the first embodiment, fine adjustment of the output characteristic of the driving motor 121 of the impact driver 100 can be easily made as desired by adjusting the number of turns of the coils of the stator windings 51, 61, 71. For example, if all of the coils are wound four turns, which means that the total number of turns of each of the stator windings in the three phases is eight, the torque output characteristic may be too high. However, if all of the coils are wound three turns, which means that the total number of turns of each of the stator windings in the three phases is six, the torque output characteristic may be too low. In such a case, a desired output characteristic can be obtained by adjusting the number of turns of the coils such that the total number of turns of each of the stator windings 51, 61, 71 is seven like in the first embodiment.

Further, in this embodiment, in which the output characteristic of the driving motor 121 is controlled by adjusting the numbers of turns of the coils, unlike the prior art (Japanese Utility Model Publication No. 61-3241) in which a subsidiary stator winding is used to adjust the output characteristic of the motor, a space for installing the subsidiary stator winding in the stator 135 is not required, so that the installation space for the stator winding can be easily ensured.

(Modification 1 to the First Embodiment)

Figure 10:
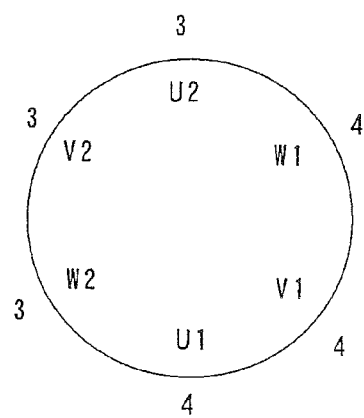
FIG. 10 is a schematic diagram for illustrating modification 1 to the first embodiment, in the construction having two slots in each phase.

FIG. 10 is a schematic diagram for illustrating modification 1 in the construction having two slots in each phase. In this modification, as shown in the drawing, the total number of turns of coils wound through slots in each phase is seven in each of the three phases U, V, W. Further, each of the coil U1 of the U-phase stator winding 51, the coil V1 of the V-phase stator winding 61 and the coil W1 of the W-phase stator winding 71 consists of four turns of wire, and each of the coil U2 of the U-phase stator winding 51, the coil V2 of the V-phase stator winding 61 and the coil W2 of the W-phase stator winding 71 consists of three turns of wire.

Specifically, in modification 1 shown in FIG. 10, the Xth coils, or, for example, the first coils U1, V1, W1 in the three phases, from the respective winding start positions are wound the same number of turns. With reference to the number of turns of the first coils U1, V1, W1 wound through the slots in the respective phases, the number of turns of each of the other coils or second coils U2, V2, W2 has a difference of one turn.

Figure 11:
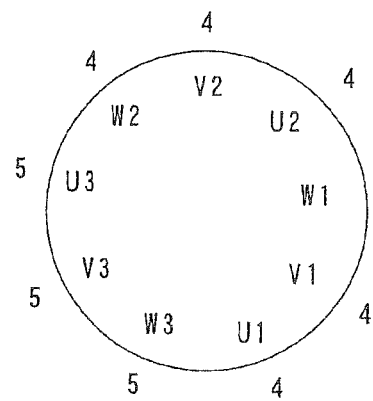
FIG. 11 is a schematic diagram for illustrating modification 1 to the first embodiment, in the construction having three slots in each phase.

FIG. 11 is a schematic diagram for illustrating modification 1 in the construction having three slots in each phase. In this modification, as shown in the drawing, the total number of turns of coils wound through slots in each phase is thirteen in each of the three phases U, V, W. Further, each of the coils U1, U2 of the U-phase stator winding 51, the coils V1, V2 of the V-phase stator winding 61 and the coils W1, W2 of the W-phase stator winding 71 consists of four turns of wire, and each of the coil U3 of the U-phase stator winding 51, the coil V3 of the V-phase stator winding 61 and the coil W3 of the W-phase stator winding 71 consists of five turns of wire.

Specifically, in modification 1 shown in FIG. 11, the Xth coils, or, for example, the first coils U1, V1, W1 in the three phases, from the respective winding start positions are wound the same number of turns. With reference to the number of turns of the first coils U1, V1, W1 wound through the slots in the respective phases, the number of turns of the second coils U2, V2, W2 has no difference and the number of turns of the third coils U3, V3, W3 has a difference of one turn.

According to the above-described modification 1 shown in FIGS. 10 and 11, the difference in the number of turns of the coils wound through slots in each phase can be minimized. Therefore, balanced adjustment of the number of turns of the coils can be made. As a result, contact between adjacent coils wound through adjacent slots can be rationally avoided, and the heights of coil ends can be made almost equal to each other, so that heat generation is also almost evenly caused.

(Modification 2 to the First Embodiment)

Figure 12:
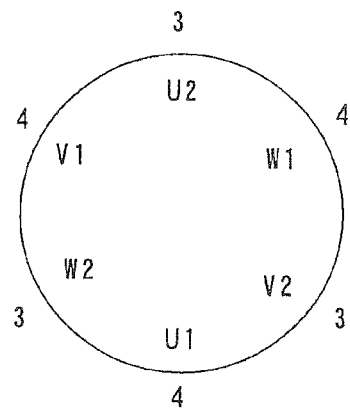
FIG. 12 is a schematic diagram for illustrating modification 2 to the first embodiment, in the construction having two slots in each phase.

FIG. 12 is a schematic diagram for illustrating modification 2 in the construction having two slots in each phase. In this modification, as shown in the drawing, the total number of turns of coils wound through slots in each phase is seven in each of the three phases U, V, W. Further, each of the coil U1 of the U-phase stator winding 51, the coil V1 of the V-phase stator winding 61 and the coil W1 of the W-phase stator winding 71 consists of four turns of wire, and each of the coil U2 of the U-phase stator winding 51, the coil V2 of the V-phase stator winding 61 and the coil W2 of the W-phase stator winding 71 consists of three turns of wire. In this modification, adjacent to the Xth coils, e.g. the first coils U1, V1, W1, from the respective winding start positions in the three phases are other than first coils (the second coils) U2, V2, W2 in different phases.

Figure 13:
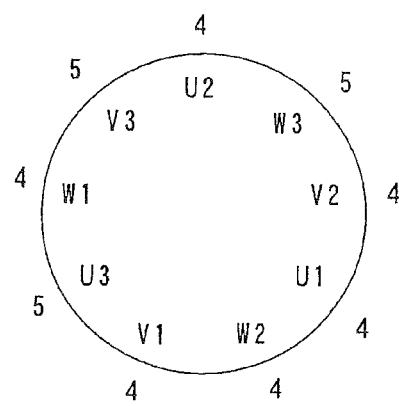
FIG. 13 is a schematic diagram for illustrating modification 2 to the first embodiment, in the construction having three slots in each phase.

FIG. 13 is a schematic diagram for illustrating modification 2 in the construction having three slots in each phase. In this modification, as shown in the drawing, the total number of turns of coils wound through slots in each phase is thirteen in each of the three phases U, V, W. Further, each of the coils U1, U2 of the U-phase stator winding 51, the coils V1, V2 of the V-phase stator winding 61 and the coils W1, W2 of the W-phase stator winding 71 consists of four turns of wire, and each of the coil U3 of the U-phase stator winding 51, the coil V3 of the V-phase stator winding 61 and the coil W3 of the W-phase stator winding 71 consists of five turns of wire. In this modification, adjacent to the Xth coil, e.g. the first coil U1 of phase U, from the winding start position are coils of other than phase U, i.e. the second coil W2 of phase W and the second coil V2 of phase V. Likewise, adjacent to the first coil V1 of phase V from the winding start position are coils of other than phase V, i.e. the third coil U3 of phase U and the second coil W2 of phase W. Further, adjacent to the first coil W1 of phase W from the winding start position are coils of other than phase W, i.e. the third coil V3 of phase V and the third coil U3 of phase U.

Specifically, in modification 2 shown in FIGS. 12 and 13, adjacent to the first coils U1, V1, W1 of the three-phase stator windings 51, 61, 71 are other than first coils in different phases. With this arrangement, imbalance in the number of turns of the coils of the stator windings 51, 61, 71 can be minimized in the circumferential direction of the stator 135, so that better balanced adjustment of the number of turns of the coils can be made compared with modification 1.

Second Embodiment

Figure 14:
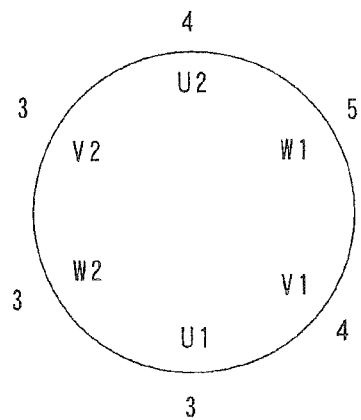
FIG. 14 is a schematic diagram for illustrating adjustment of the numbers of turns of coils in a second embodiment, in the construction having two slots in each phase.

FIG. 14 is a schematic diagram for illustrating adjustment of the number of turns of the coils in the construction having two slots in each phase, and shows the arrangement and the numbers of turns of the coils U1, U2, V1, V2, W1, W2. Numerals in the drawing represent the numbers of turns of the coils. In this embodiment, in phases U and V, each of the coil U1 and the coil V2 consists of three turns of wire, and each of the coil U2 and the coil V1 consists of four turns of wire, which means that the total number of turns of the coils is seven in each of the phases U and V. In phase W, the coil W1 consists of five turns of wire and the coil W2 consists of three turns of wire, which means that the total number of turns of wire is eight. Specifically, the total number of turns of all of the coils wound through all the (six) slots is twenty-two which is not a multiple of three. In this case, the number of turns of the coils per slot is 3.66.

Figure 15:
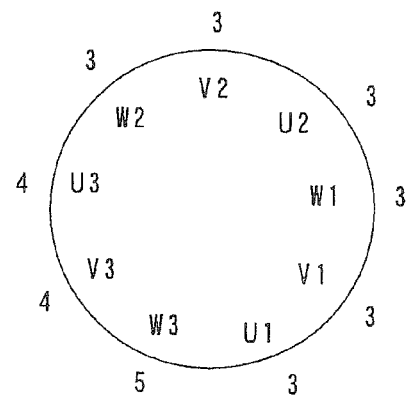
FIG. 15 is a schematic diagram for illustrating adjustment of the numbers of turns of coils in the second embodiment, in the construction having three slots in each phase.

FIG. 15 is a schematic diagram for illustrating adjustment of the number of turns of the coils in the construction having three slots in each phase, and shows the arrangement and the numbers of turns of the coils U1, U2, U3, V1, V2, V3, W1, W2, W3. Numerals in the drawing represent the numbers of turns of the coils. In this embodiment, in phases U and V, each of the coils U1, V1, U2, V2 consists of three turns of wire, and each of the coils U3, V3 consists of four turns of wire, which means that the total number of turns of the coils is ten in each of the phases U and V. In phase W, each of the coils W1, W2 consists of three turns of wire and the coil W3 consists of five turns of wire, which means that the total number of turns of wire is eleven. Specifically, the total number of turns of all of the coils wound through all the (six) slots is thirty-one which is not a multiple of three. In this case, the number of turns of the coils per slot is 3.44.

Specifically, in the second embodiment shown in FIGS. 14 and 15, the total number of turns of the coils in one of the three phases is different from that in at least one of the other two phases, and the total number of turns of the coils wound through all the slots is not a multiple of three.

According to the second embodiment constructed as described above, the total number of turns of the coils of each of the two stator windings 51, 61 in two of the three phases is the same as that of the other, and the difference between the stator windings 51, 61 and the other stator winding 71 in the total number of turns of the coils is minimum. Therefore, when the driving current passes through the stator windings 51, 61, 71, the magnetic field that is generated around each of the stator windings 51, 61, 71 does not easily vary in strength.

Further, according to the second embodiment, like in the first embodiment, fine adjustment of the output characteristic of the driving motor 121 of the impact driver 100 can be easily made as desired by adjusting the number of turns of the coils of the stator windings 51, 61, 71. Further, in this embodiment, in which the output characteristic of the driving motor 121 is controlled by adjusting the numbers of turns of the coils, unlike the prior art (Japanese Utility Model Publication No. 61-3241) in which a subsidiary stator winding is used to adjust the output characteristic of the motor, a space for installing the subsidiary stator winding in the stator 135 is not required, so that the installation space for the stator winding can be easily ensured.

(Modification 1 to the Second Embodiment)

Figure 16:
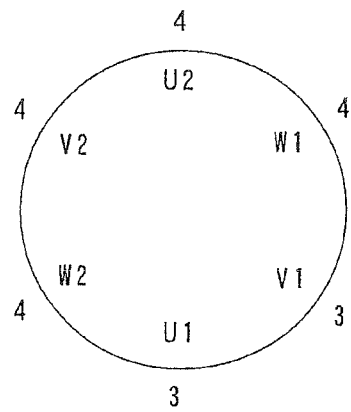
FIG. 16 is a schematic diagram for illustrating modification 1 to the second embodiment, in the construction having two slots in each phase.

FIG. 16 is a schematic diagram for illustrating modification 1 in the construction having two slots in each phase. In this modification, in phases U and V, each of the coils U1, V1 consists of three turns of wire, and each of the coils U2, V2 consists of four turns of wire, which means that the total number of turns of the coils is seven in each of the phases U and V. In phase W, each of the coils W1, W2 consists of four turns of wire, which means that the total number of turns of wire is eight.

Specifically, in modification 1 shown in FIG. 16, with reference to a total of seven turns of the coils U1, U2 wound through the slots in phase U, the total number of turns of the V-phase coils V1, V2 has no difference from that of the U-phase coils U1, U2, and the total number of turns of the W-phase coils W1, W2 has a difference of one turn.

Figure 17:
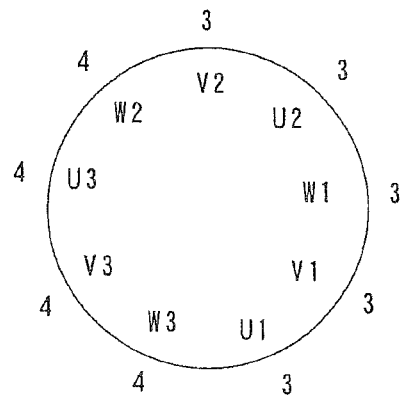
FIG. 17 is a schematic diagram for illustrating modification 1 to the second embodiment, in the construction having three slots in each phase.

FIG. 17 is a schematic diagram for illustrating modification 1 in the construction having three slots in each phase. In this modification, in phases U and V, each of the coils U1, V1, U2, V2 consists of three turns of wire, and each of the coils U3, V3 consists of four turns of wire, which means that the total number of turns of the coils is ten in each of the phases U and V. In phase W, the coil W1 consists of three turns of wire and each of the coils W2, W3 consists of four turns of wire, which means that the total number of turns of wire is eleven.

Specifically, in modification 1 shown in FIG. 17, with reference to a total of ten turns of the coils U1, U2, U3 wound through the slots in phase U, the total number of turns of the V-phase coils V1, V2, V3 has no difference from that of the U-phase coils U1, U2, U3, and the total number of turns of the W-phase coils W1, W2, W3 has a difference of one turn.

According to the above-described modification 1 shown in FIGS. 16 and 17, the difference in the number of turns of the coils wound through slots in each phase can be minimized.

Therefore, balanced adjustment of the number of turns of the coils can be made. As a result, contact between adjacent coils wound through adjacent slots can be rationally avoided, and the heights of coil ends can be made almost equal to each other, so that heat generation is also almost evenly caused.
(Modification 2 to the Second Embodiment)

Figure 18:
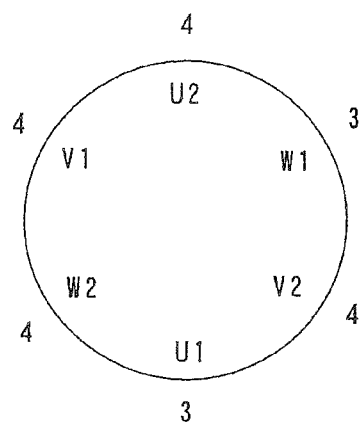
FIG. 18 is a schematic diagram for illustrating modification 2 to the second embodiment, in the construction having two slots in each phase.

FIG. 18 is a schematic diagram for illustrating modification 2 in the construction having two slots in each phase. In this modification, as shown in the drawing, in phases U and W, each of the coils U1, W1 consists of three turns of wire, and each of the coils U2, W2 consists of four turns of wire, which means that the total number of turns of the coils is seven in each of the phases U and W. In phase V, each of the coils V1, V2 consists of four turns of wire, which means that the total number of turns of the coils is eight. Further, the Xth coils, e.g. the second coils U2, V2, W2, from the respective winding start positions in the three phases consist of the same number of turns of wire, and adjacent to the second coils U2, V2, W2 are other than second coils (the first coils) U1, V1, W1 in different phases.

Figure 19:
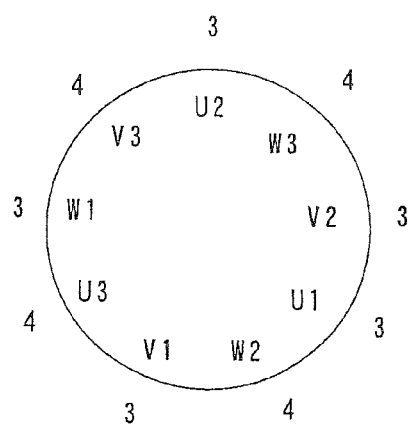
FIG. 19 is a schematic diagram for illustrating modification 2 to the second embodiment, in the construction having three slots in each phase.

FIG. 19 is a schematic diagram for illustrating modification 2 in the construction having three slots in each phase. In this modification, in phases U and V, each of the coils U1, V1, U2, V2 consists of three turns of wire, and each of the coils U3, V3 consists of four turns of wire, which means that the total number of turns of the coils is ten in each of the phases U and V. In phase W, the coil W1 consists of three turns of wire and each of the coils W2, W3 consists of four turns of wire, which means that the total number of turns of wire is eleven. The Xth coils, e.g. the first coils U1, V1, W1, from the respective winding start positions in the three phases consist of the same number of turns of wire. Adjacent to the first coil U1 of phase U are coils of other than phase U, i.e. the second coil V2 of phase V and the second coil W2 of phase W. Likewise, adjacent to the first coil V1 of phase V are coils of other than phase V, i.e. the second coil W2 of phase W and the third coil U3 of phase U. Further, adjacent to the first coil W1 of phase W are coils of other than phase W, i.e. the third coil U3 of phase U and the third coil V3 of phase V.

Specifically, in modification 2 shown in FIGS. 18 and 19, the first coils U1, V1, W1 of the three phases consist of the same number of turns of wire, and adjacent to the first coils U1, V1, W1 of the stator windings 51, 61, 71 in the three phases are other than first coils in different phases. With this arrangement, imbalance in the number of turns of the coils of the stator windings 51, 61, 71 can be minimized in the circumferential direction of the stator 135, so that better balanced adjustment of the number of turns of the coils can be made compared with modification 1.

The invention is not limited to the constructions of these embodiments. For example, in these embodiments, the total number of turns of the coils of each phase and the number of turns of each coil are described just as an example and can be changed.

Further, the winding start and end positions of each coil may be located on the same side or on different sides in the longitudinal direction of the stator 135. Further, the connecting wires of the stator windings may be located on the winding start position or on a side opposite from the winding start position.

DESCRIPTION OF NUMERALS 100 impact driver (power tool)
101 body
103 motor housing
105 gear housing
107 handgrip
109 driver bit (tool bit)
111 speed reducing mechanism
112 spindle
113 ball
114 hammer
115 anvil
116 compression coil spring
121 driving motor (brushless motor)
122 output shaft
123, 124 bearing
125 trigger
127 battery
133 rotor
133a ring magnet
135 stator
U1, U2, U3 U-phase coil
V1, V2, V3 V-phase coil
W1, W2, W3 W-phase coil
31 to 39 teeth
51 U-phase stator winding
51a connecting wire
53 U starting point
55 U endpoint
61 V-phase stator winding
61a connecting wire
63 V starting point
65 V endpoint
71 W-phase stator winding
71a connecting wire
73 W starting point
75 W endpoint
S1 to S9 slot

What we claim is:

1. A power tool comprising a brushless motor, the power tool performing a predetermined operation by rotationally driving a tool bit by the brushless motor, wherein
the brushless motor includes a rotor having a permanent magnet, a cylindrical stator, and three-phase stator windings which are installed on an inner circumferential side of the stator and rotationally drive the rotor,
a plurality of slots are formed in an inside surface of the stator at predetermined intervals in a circumferential direction and each of the three-phase stator windings is formed by a plurality of coils wound through the slots of the stator and connected to each other,
the number of turns of the coils is adjusted to control the output characteristic of the brushless motor, and
the number of turns of the coils is adjusted such that the total number of turns of the coils wound through the slots in each phase is the same in the three phases and not a multiple of the number of the slots in each phase.

2. The power tool according to claim 1, wherein:
Xth coils in the three phases consist of the same number of turns of wire and,
with reference to the number of turns of one of the coils wound through the slots in each phase, the number of turns of at least one of the other coils has a difference of one turn and the number of turns of each of the other coils has no difference or a difference of one turn.

3. The power tool according to claim 2, wherein:
adjacent to the Xth coils are other than Xth coils in different phases.

4. A power tool comprising a brushless motor, the power tool performing a predetermined operation by rotationally driving a tool bit by the brushless motor, wherein
the brushless motor includes a rotor having a permanent magnet, a cylindrical stator, and three-phase stator windings which are installed on an inner circumferential side of the stator and rotationally drive the rotor, a plurality of slots are formed in an inside surface of the stator at predetermined intervals in a circumferential direction and each of the three-phase stator windings is formed by a plurality of coils wound through the slots of the stator and connected to each other, the number of turns of the coils is adjusted to control the output characteristic of the brushless motor, and the number of turns of the coils is adjusted such that the total number of turns of the coils in one of the three phases is different from that of at least one of the other two phases and the total number of turns of the coils wound through all the slots is not a multiple of the number of the slots in each phase.

5. The power tool according to claim 4, wherein:

with reference to the total number of turns of the coils wound through the slots in one of the phases, the number of turns of the coils in at least one of the other phases has a difference of one turn and the number of turns of the coils in the other phase has no difference or a difference of one turn.

6. The power tool according to claim 5, wherein:

Xth coils in the three phases consist of the same number of turns of wire, and adjacent to the Xth coils are other than Xth coils in different phases.

* * * * *